(12) United States Patent
Yuan

(10) Patent No.: US 9,242,883 B2
(45) Date of Patent: Jan. 26, 2016

(54) PRE-TREATMENT OF SLUDGE

(75) Inventor: Zhiguo Yuan, Brisbane (AU)

(73) Assignee: THE UNIVERSITY OF QUEENSLAND, St. Lucia, Queensland (AU)

( * ) Notice: Subject to any disclaimer, the term of this patent is extended or adjusted under 35 U.S.C. 154(b) by 0 days.

(21) Appl. No.: 14/130,101

(22) PCT Filed: Jun. 22, 2012

(86) PCT No.: PCT/AU2012/000725
§ 371 (c)(1),
(2), (4) Date: Mar. 27, 2014

(87) PCT Pub. No.: WO2013/000010
PCT Pub. Date: Jan. 3, 2013

(65) Prior Publication Data
US 2014/0202956 A1    Jul. 24, 2014

(30) Foreign Application Priority Data

Jun. 30, 2011    (AU) ............................... 2011902595

(51) Int. Cl.
*C02F 11/02*    (2006.01)
*C02F 11/00*    (2006.01)
*C02F 1/72*    (2006.01)
*C02F 3/12*    (2006.01)

(52) U.S. Cl.
CPC .............. *C02F 11/02* (2013.01); *C02F 11/00* (2013.01); *C02F 1/72* (2013.01); *C02F 1/722* (2013.01); *C02F 1/727* (2013.01); *C02F 3/1221* (2013.01); *C02F 2303/06* (2013.01); *Y02W 10/15* (2015.05)

(58) Field of Classification Search
CPC ................................. C02F 11/02; C02F 11/00
USPC .................................. 210/610–611, 758–759
See application file for complete search history.

(56) References Cited

U.S. PATENT DOCUMENTS

| | | | | |
|---|---|---|---|---|
| 4,537,682 A | * | 8/1985 | Wong-Chong | 210/611 |
| 4,772,396 A | * | 9/1988 | Voyt | 210/605 |
| 5,281,341 A | | 1/1994 | Reimers et al. | |
| 5,705,072 A | * | 1/1998 | Haase | 210/605 |
| 5,849,192 A | * | 12/1998 | Jagush et al. | 210/610 |
| 7,438,813 B1 | * | 10/2008 | Pedros et al. | 210/603 |
| 7,972,511 B2 | * | 7/2011 | Tokutomi et al. | 210/610 |
| 2009/0282882 A1 | | 11/2009 | Verhave et al. | |

FOREIGN PATENT DOCUMENTS

| | | |
|---|---|---|
| CN | 101284697 | 10/2008 |
| JP | 2006-130397 | 5/2006 |
| JP | 2010-5554 | 1/2010 |

(Continued)

OTHER PUBLICATIONS

Zhou, et al., "The role if nitrite and free nitrous acid (FNA) in wastewater treatment plants," Wat. Res., 45 (2011) 4672-4682, available online Jun. 28, 2011.*

(Continued)

*Primary Examiner* — Chester Barry
(74) *Attorney, Agent, or Firm* — Nixon & Vanderhye P.C.

(57) ABSTRACT

A method for treating a sludge to be fed to a bioreactor for treating wastewater, or an anaerobic or aerobic sludge digester, the method comprising contacting the sludge with free nitrous acid.

23 Claims, 7 Drawing Sheets

(56) References Cited

FOREIGN PATENT DOCUMENTS

| WO | WO 2011/134010 A1 | 11/2011 |
|---|---|---|
| WO | WO 2011/134011 A1 | 11/2011 |
| WO | WO 2013/006890 A1 | 1/2013 |

OTHER PUBLICATIONS

Ma, et al., "Effect of free nitrous acid as inhibitors on nitrate reduction by a biological nutrient removal sludge," J. Hazardous Materials 175(2010) 518-523.*

International Search Report for PCT/AU2012/000725, mailed Aug. 31, 2012.
Written Opinion for PCT/AU2012/000725, mailed Aug. 31, 2012.
Ma et al., "Effect of free nitrous acid as inhibitors on nitrate reduction by a biological nutrient removal sludge", *Journal of Hazardous Materials*, 2010, vol. 175, pp. 518-523.
Chinese Office Action dated Nov. 15, 2014.
Extended European Search Report issued in EP Application No. 12804223.1 dated Jan. 26, 2015.
Jiang et al., "The strong biocidal effect of free nitrous acid on anaerobic sewer biofilms," *Water Research*, 2011, vol. 45, pp. 3735-3743.

* cited by examiner

PRE-TREATMENT OF SLUDGE

This application is the U.S. national phase of International Application No. PCT/AU2012/000725 filed 22 Jun. 2012 which designated the U.S. and claims priority to AU Patent Application No. 2011902595 filed 30 Jun. 2011, the entire contents of each of which are hereby incorporated by reference.

The present invention relates to a process for the pre-treatment of sludge. In some embodiments, the present invention relates to the pre-treatment of a sludge from a bioreactor for treating wastewater/secondary treatment in a wastewater treatment plant, with the treated sludge being fed to an anaerobic digester, an aerobic digester or back to bioreactor for treating wastewater.

BACKGROUND TO THE INVENTION

Microbial processes play a central role in wastewater management. In particular, they underpin biological treatment of wastewater, the most cost-effective and environmentally friendly method for wastewater treatment.

A typical advanced wastewater treatment plant receives wastewater from sewage mains. The wastewater is first treated to remove large particulates (by screening, or passing through a primary settler, or both). The liquor then passes to bioreactors, where bacteria mineralise organic carbon (often referred to as biological oxygen demand or BOD) to CO2 and convert ammonia to nitrate, and in some cases further to nitrogen gas. Some bioreactors also achieve biological phosphorus removal. This process results in the growth of biomass. The biomass is then separated from the liquor, typically in a secondary settler.

The sludge from the secondary settler (which includes most of the separated biomass) is then treated in an anaerobic digester or an aerobic digester, sometimes together with primary sludge resulting from the settling process in the primary settler. In the anaerobic digester, the BOD of the sludge is converted to methane. Products from the anaerobic digester also include solids that may be disposed of and a liquid stream. In the aerobic digester, part of the organics in the sludge is mineralised thus achieving the stabilisation and a reduction of the sludge to be disposed of.

Variations around this general process described above also exist.

Bioreactors used for treating primary effluent can consist of aerobic, anoxic and even anaerobic zones/conditions. Throughout this specification, the term "bioreactor for treating wastewater" is used to refer to any reactor in which microorganisms utilise or catalyse conversion of wastewater stream components into other components. The bioreactor may be an aerobic bioreactor, an anaerobic bioreactor or an anoxic bioreactor, or it may be operated under two or more such conditions (typically in sequence, but different zones of a bioreactor may operate under different conditions, for example, a top part of a bioreactor may be operating under aerobic conditions and a bottom part of the bioreactor may be operating under anaerobic conditions.

In a typical wastewater treatment plant, both biological nutrient removal and energy recovery require organic carbon. The requirement for high-level nutrient removal from wastewaters has often seen the abolishment of the primary settler, to satisfy the carbon demand for nutrient removal in the downstream processes of the wastewater treatment plant. However, abolishing the primary settler eliminates an energy rich stream for anaerobic digestion. This reduces the energy yield of the plant and renders energy recovery through anaerobic digestion economically infeasible for small to medium-sized wastewater treatment plants.

One reason for the high demand of organic carbon feed for nutrient removal is biomass production. In this regard, in the bioreactor for treating wastewater, the reactions that are taking place are typically biologically driven. As a result, the microorganisms that catalyse these reactions grow and a substantial biomass is produced. These microorganisms assimilate a large amount organic carbon as biomass. Typically, 30 to 40% of the organic carbon fed to the bioreactor is assimilated by bacterial cells in the form of active bacterial cells and debris resulting from cell death and lysis, and is subsequently removed from the bioreactor as excess secondary sludge.

The secondary sludge is often supplied to an anaerobic digester in order to convert the BOD of the sludge to biogas containing methane. However, this large stream of secondary sludge, although containing large amounts of organic carbon, is poorly biodegradable. Pre-treatment of the sludge is required to break up bacterial cell walls to make its carbon more available for the reactions in the anaerobic digester, such as methane production, or in another bioreactor for treating wastewater as an external carbon source for denitrification.

Various methods have been developed to improve the bioavailability of this sludge stream. However, these methods are either energy intensive (such as thermal treatment, sonication, or ozonation) or consume large amounts of imported chemicals, such as acid, alkali or hydrogen peroxide. This incurs significant economic and environmental costs.

BRIEF DESCRIPTION OF THE INVENTION

In a first aspect, the present invention provides a method for treating a sludge to be fed to a bioreactor for treating wastewater or an anaerobic or an aerobic sludge digester, the method comprising contacting the sludge with free nitrous acid.

In a second aspect, the present invention provides a method for treating a sludge to be fed to a bioreactor for treating wastewater or an anaerobic or an aerobic sludge digester, the method comprising contacting the sludge with nitrite in solution at a pH of less than 7.

In one embodiment, the sludge comprises a sludge from a secondary settler. Such a sludge may comprise, for example, a sludge removed from a bioreactor for treating wastewater.

In another embodiment, the sludge may comprise a sludge removed from a primary settler. In a further embodiment, the sludge may comprise a mixture of a sludge removed from a bioreactor for treating wastewater and a sludge removed from a primary settler.

In some embodiments, the treated sludge is used as a feed to an anaerobic or an aerobic digester. In other embodiments, the treated sludge is used as a feed to a bioreactor for treating wastewater.

In some embodiments, the mixture of sludge and free nitrous acid (that is formed by contacting the sludge with the free nitrous acid) may have a pH that is less than 6.5, more desirably less than 6.0, even more desirably less than 4, or even less than 2. A mixture of sludge and free nitrous acid may have a free nitrous acid content of at least 0.05 ppm, preferably at least 0.1 ppm, preferably at least 0.5 ppm, preferably at least 1 ppm, more suitably at least 2 ppm.

The free nitrous acid may be continuously added to the sludge being treated. In other embodiments, the free nitrous acid may be added to the sludge on an intermittent basis.

In some embodiments, the sludge is contacted with free nitrous acid by contacting the sludge with a liquid stream containing free nitrous acid, such as an aqueous stream containing free nitrous acid.

The liquid stream containing free nitrous acid or containing nitrite may have a pH that is less than 6.5, more desirably less than 6.0. In some embodiments, the pH of the liquid stream containing free nitrous acid may be less than 4, or even less than 2. The liquid stream may comprise a liquid stream containing nitrite and having an acidic pH. It will be appreciated that free nitrous acid is formed when liquid streams containing nitrite have an acidic pH. Generally, a lower pH value for a liquid stream containing nitrite will result in a higher content of free nitrous acid.

In some embodiments, the liquid stream containing free nitrous acid has a free nitrous acid content of at least 0.5 ppm, preferably at least 1 ppm, more suitably at least 2 ppm.

The liquid stream containing free nitrous acid may be continuously added to the sludge being treated. In other embodiments, the liquid stream containing free nitrous acid may be added to the sludge on an intermittent basis.

The sludge and the liquid containing free nitrous acid may be contacted together using any suitable contacting apparatus. For example, the sludge and the liquid containing free nitrous acid may be mixed in a stirred tank or in an agitated tank. Any type of agitation known to be suitable to the person skilled in the art, such as stirrers, paddles or draft tubes, may be used.

According to a third aspect, the present invention provides a method for treating a sludge comprising treating the sludge in accordance with the first aspect of the present invention or the second aspect of the present invention and passing the treated sludge to a digester or to a bioreactor for treating wastewater.

The present inventors have found that adding free nitrous acid to the sludge acts to kill much of the bacteria and microorganisms in the sludge. This enhances the biodegradability of the sludge and therefore makes more of the sludge available to the microorganisms in the bioreactor for treating wastewater or in the anaerobic or an aerobic sludge digester. Accordingly, the quality of "feed" for the microorganisms in the bioreactor for treating wastewater or in the anaerobic or an aerobic sludge digester that receives the treated sludge is improved. The present inventors also believe that adding free nitrous acid to the sludge causes lysis of the cell membranes of microorganisms in the sludge. This also assists in improving the biodegradability of the sludge.

The sludge may be treated by contacting it with the liquid containing free nitrous acid and subsequently the treated sludge may be fed to a bioreactor for treating wastewater or to an anaerobic or an aerobic sludge digester. Alternatively, the sludge may undergo further treatment using conventional treatment steps prior to being fed to the bioreactor or digester. The conventional treatment steps may take place after treatment of the sludge with free nitrous acid, at the same time as treatment of the sludge with free nitrous acid or before treatment of the sludge with free nitrous acid.

The present inventors believe that the amount of free nitrous acid added per kilogram of sludge is unlikely to be especially critical. Once a minimum concentration of free nitrous acid is achieved or maintained, the present inventors believe that the advantageous effects of the present invention should be achieved. It is possible that for thicker sludges, the more difficult it may be for the free nitrous acid to diffuse into flocs. Therefore, for thicker sludges, the concentration of free nitrous acid in the liquid phase may need to be higher to be effective. Further, as the free nitrous acid is generated by providing a nitrite containing solution having an acidic pH, some levels of nitrite consumption may take place during treatment and a higher biomass concentration may lead to a higher rate of consumption of nitrite. However, experimental work conducted by the inventors to date has observed little nitrite consumption.

In some embodiments of the present invention, the treatment of the sludge can be controlled such that nitrogen removal with the sludge can occur via the nitrite pathway, that is, through ammonium oxidation to nitrite and then nitrite reduction to dinitrogen gas. This pathway can be schematically described as $NH_4^+ \square NO_2^- \square N_2$. In particular, the operating premise of the method can be controlled such that nitrite oxidising bacteria are largely eliminated from the system whilst ammonium oxidising bacteria remained in the system. In some embodiments, the concentration of free nitrous acid, the duration of treatment with free nitrous acid and the solids retention time can be controlled such that nitrite oxidising bacteria are largely eliminated from the system whilst ammonium oxidising bacteria remained in the system. This process can reduce the oxygen requirement for nitrification by up to 25% and the carbon requirement for denitrification by up to 40%.

This embodiment of the present invention is based upon the discovery that treatment with FNA results in the reduction of ammonium oxidising bacteria (AOB), nitrite oxidising bacteria (NOB) and other heterotrophic organisms (OHO). However, treatment with FNA results in a significantly greater reduction in NOB and OI1O, when compared to the reduction that occurs in AOB. During full nitrification, AOB oxidise ammonia to nitrite, NOB then oxidise nitrite ($NO_2^-$) to nitrate ($NO_3^-$). The oxidation of nitrite to nitrate consumes 25% of the oxygen required for ammonium oxidation to nitrate. In the subsequent denitrification, nitrate is reduced to nitrite, and nitrite is further reduced to dinitrogen gas via nitric oxide and nitrous oxide. This process requires organic carbon as the electron donor. The amount of carbon required for nitrate reduction to nitrite represents 40% of that requires for full conversion of nitrate to dinitrogen gas. By reducing AOB to a certain extent and reducing AOB and OHO to a greater extent by treatment with FNA, the amount of nitrite oxidized to nitrate is reduced, thereby reducing the amount of oxygen required for the oxidation of ammonium, and the amount of carbon required to support the reduction steps. The savings in oxygen and carbon consumption can be up to 25% and 40%, respectively.

Accordingly, in a fourth aspect, the present invention provides a method for sludge treatment, the method comprising the steps of treating the sludge with free nitrous acid to reduce a level of AOB and to reduce NOB and OHO to a significantly greater level to thereby minimise oxidation of nitrite to nitrate, and subsequently subjecting nitrite produced to a reduction treatment to produce dinitrogen gas. Desirably, the step of treating the sludge with FNA largely eliminates NOB. OHO may also be largely reduced in that step, but will not be eliminated due to their faster growth rates compared to AOB and NOB.

In some embodiments, the present invention envisages treating the sludge with other chemicals, as well as with free nitrous acid. The other chemicals may be selected from hydrogen peroxide or oxygen. It will be understood that the present invention encompasses the inclusion of free nitrous acid with other chemical treatment agents that may be used in the treatment of sludge.

In some embodiments, the method of the present invention may be conducted at ambient temperature or in the absence of external heating. In other embodiments, the method of the present invention may be conducted at elevated temperatures. For example, the method may be conducted with temperatures in the range of 30 to 60° C. The present invention encompasses operation of the method at any suitable temperature.

The present invention also encompasses any suitable treatment time that will produce the desired results obtained by the present invention. It is believed that treatment times in the order of from one hour to 1 week are suitable, more suitably between six hours and two days. However, the present invention may also encompass significantly longer treatment times. In some embodiments, the treatment time may be calculated as the average residence time for the sludge in the reactor or in the process vessel.

The solution containing free nitrous acid may be formed from a nitrite containing solution generated in a water treatment processing plant. In this manner, formation of the solution containing free nitrous acid may occur at relatively low cost. Furthermore, in this embodiment, large quantities of solution containing free nitrous acid can be formed. Formation of the free nitrous acid stream can be achieved using biological processes. The nitrite containing solution may be generated in accordance with the process as described in our international patent application number PCT/AU2011/000482, the entire contents of which are incorporated herein by cross reference.

In some embodiments, it may be desirable to thicken the sludge before treating the sludge in accordance with the present invention. Some wastewater treatment plants have a sludge thickener to obtain a more concentrated sludge for the sludge treatment. If this is the case, the treatment step of the present invention may be placed after the thickener. Without wishing to be bound by theory, it is believed that by thickening the sludge, it will be possible to reduce the amount of free nitrous acid required (due to reduction in sludge volume and assuming that it will not be necessary to increase the effective free nitrous acid concentration). This would reduce the cost for provision of the free nitrous acid. Furthermore, it will also be possible to reduce the amount of free nitrous acid that is fed to the bioreactor for treating wastewater or the anaerobic or an aerobic sludge digester following treatment of the sludge in accordance with the present invention. In this regard, feeding free nitrous acid to the bioreactor is expected to be detrimental to operation in the bioreactor or the digester. In some embodiments, it may be desirable to slowly feed the treated sludge to the bioreactor, which would tend to dilute the free nitrous acid, thereby reducing its toxic effects in the bioreactor. However, nitrite is an electron acceptor and it will oxidise some organic carbon produced during the treatment step of the present invention. Therefore, it may be desirable to add as little nitrite as possible per unit mass of sludge. In this regard, the treatment step of the present invention could be carried out at a lower pH, as less nitrite will be required to produce the desired level of free nitrous acid. Thickened sludge may also be favoured as this may allow a reduction in the nitrite/sludge mass ratio.

The liquid containing free nitrous acid may be generated as part of the overall water treatment process. In one embodiment, the liquid containing free nitrous acid is generated by providing a nitrite containing liquid having an acidic pH.

BRIEF DESCRIPTION OF THE DRAWINGS

In FIG. 8, the uppermost line shows the results for added FNA-treated sludge, the lowest line at the right hand end of the lines in the graph relates to added untreated sludge and the other line relates to untreated effluent.

EXAMPLE 1

Figure 1A:
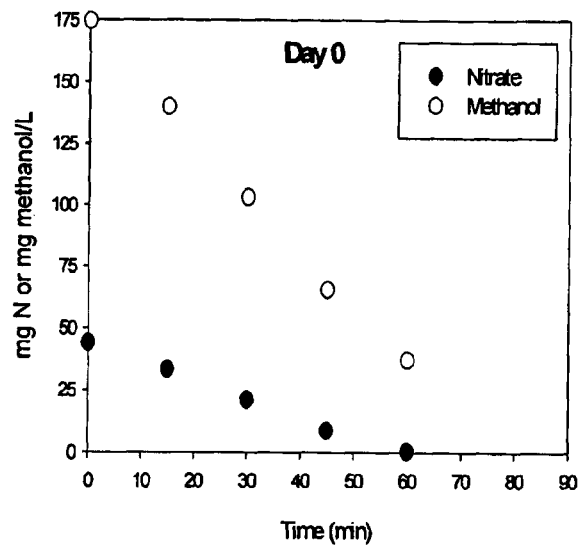
FIG. 1 shows a graph of nitrate and, methanol consumption in batch experiments performed prior to and after a 48 hour starvation period.

This example demonstrates the biocidal effect of FNA on denitrifying biomass.

In order to determine the effect of contacting a sludge with a liquid containing free nitrous acid, a sludge from a denitrifying sequencing batch reactor was grown using a synthetic feed containing methanol and nitrate. Methanol provided the carbon source and nitrate provided the electron acceptor. The following procedure was followed:

1. Sludge removed from the denitrifying SBR (sequencing batch reactor). The biomass was enriched for 5 months in an 8 L reactor with methanol as the carbon source and nitrate as the electron acceptor.

2. A batch experiment was performed at pH 6 for initial biomass activity determination. At the beginning of the test, nitrate and methanol were added. Liquid phase samples were taken every 15 minutes for the analysis of nitrate and methanol. The consumption rates of methanol and nitrate were determined. All other batch tests described below were also conducted at pH 6.

3. Fresh sludge of 2 L was removed from the SBR at the end of a cycle, and equally divided into two batch reactors, namely the control and the experimental reactors.
   a. The sludge in the control reactor was kept at pH 6 under mixed conditions for 48 hours;
   b. The sludge in the experimental reactor was kept at pH 6 under mixed conditions for 48 hours. Nitrite was added to the reactor at the beginning of the test, which resulted in 500 mg $NO_2^-$-N/L in the reactor. The concentration of free nitrous acid was estimated to be approximately 0.97 ppm.

4. 24 hours after the above conditions were started, sludge samples of 250 mL each were removed from both the control and the experimental reactors, and batch experiments as described in Step 2 were performed. Before the addition of nitrate and methanol, the sludges were washed with effluent from the parent SBR to ensure that both sludge samples were nitrite-free.

5. The above tests were repeated at 48 hours.

6. Sludge samples were also removed at 48 hours from both reactors to quantify the live/dead cells using the Live/Dead BacLight Bacterial Viability assay.

7. At 48 hours, the experimental reactor was washed with the effluent from the parent SBR to remove the residual nitrite. Nitrate and methanol were then added to the reactor resulting in concentrations of 50 mgNO2$^-$-N/L and 150 mg/L, respectively. The methanol and nitrate consumptions rates at the end of Day 3, Day 4 and Day 7 were measured through measuring the nitrate and methanol concentrations over a period over one hour each time. This series of tests were carried out to monitor the recovery of the biomass activity after being exposed to FNA for 48 hours.

Experiments with Full-Scale Sludge

Similar tests were performed on a full-scale sludge. However, no activity tests were carried out. The experiments focused on verifying the biocidal effect of FNA on bacteria in a full-scale sludge taken from local sewage treatment plant treating primarily domestic wastewater. The nitrite concentration applied to the experimental reactor was 500 mgNO2-N/L. pH was maintained at 6.0 in both the control and experimental reactors.

Results

Treatment of the Methanol Sludge

Figure 1B:
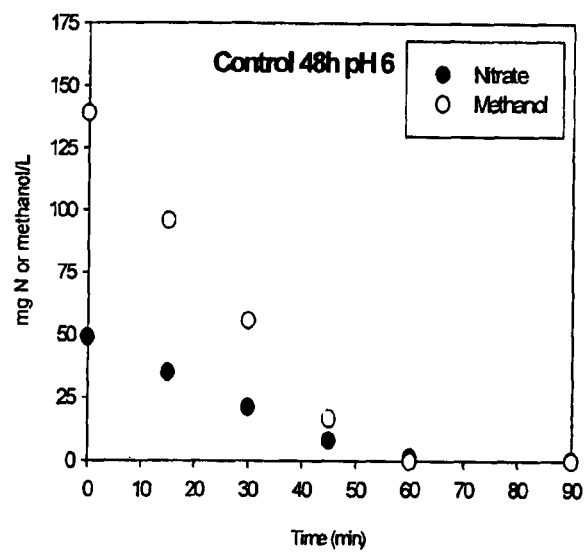
Figure 1C:
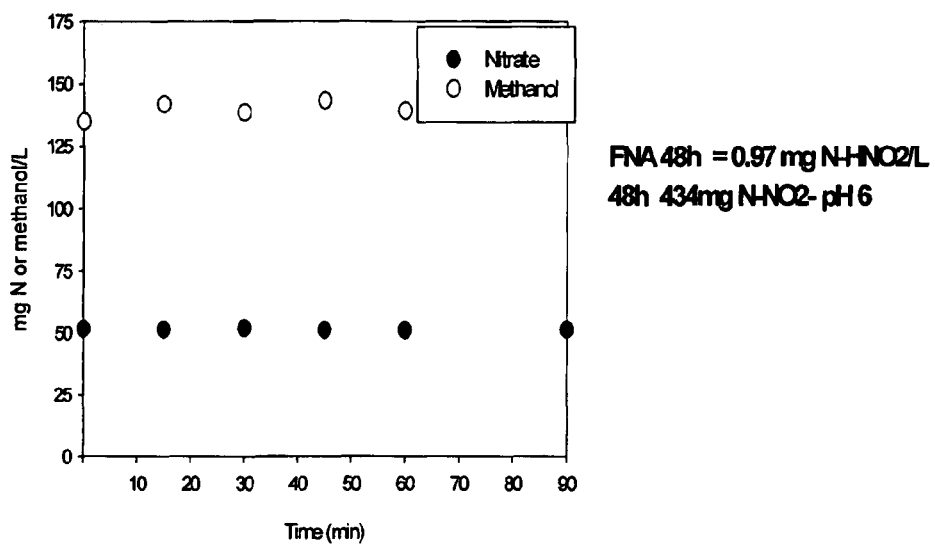

Table 1 shows the activity of the sludges in the control and experimental reactors. FIG. 1 shows detailed batch test results on Day 0 and Day 2. Table 2 shows the percentages of live and dead cells in both reactors 48 hours after the starvation.

TABLE 1

Summary of the methanol and nitrate consumption rates during the 48 hour starvation period.

|  | Day 0 | Day 1 | | Day 2 | |
| --- | --- | --- | --- | --- | --- |
|  |  | Control reactor | Experimental reactor | Control reactor | Experimental reactor |
| mg N—NO$_3^-$/gVSS*min | 0.524 | 0.135 | 0.014 | 0.54 | 0.004 |
| mg Methanol/gVSS*min | 1.270 | 0.330 | 0.051 | 1.61 | 0.0 |

TABLE 2

Live and dead cells in the control and experimental reactors 48 hours after the starvation.

| Experimental (16 images) | | | Control (21 images) | | |
| --- | --- | --- | --- | --- | --- |
| Average (% dead cells) | St dev. | St. Error | Average (%) | St dev. | St. Error |
| 40.4 | 12 | 3.2 | 7.06 | 3.6 | 0.79 |

Recovery of the FNA Treated Methanol Sludge

Figure 2A:
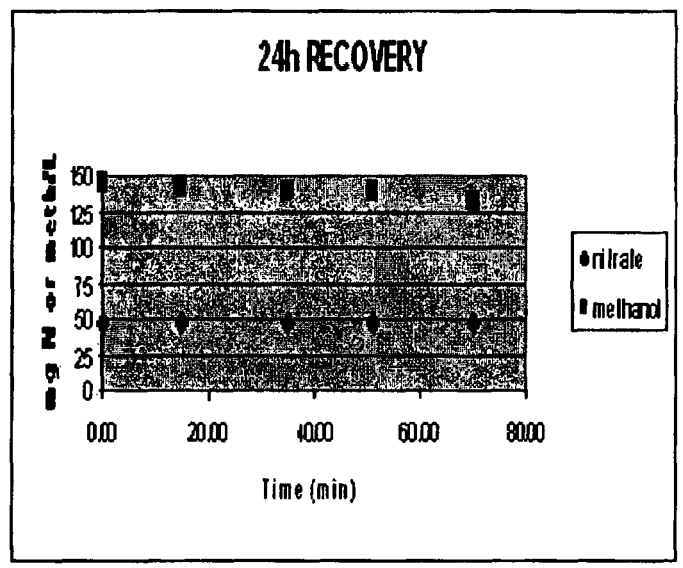
FIG. 2 shows graphs of batch tests measuring the activity recovery of the experimental sludge.
Figure 2B:
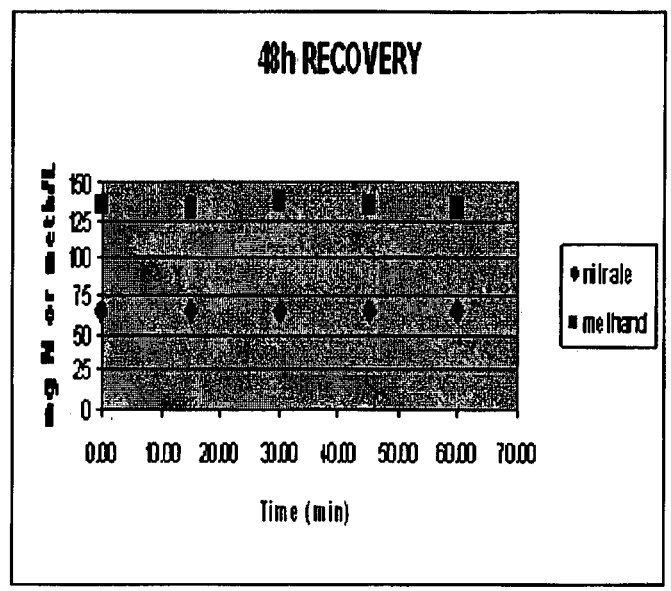
Figure 2C:
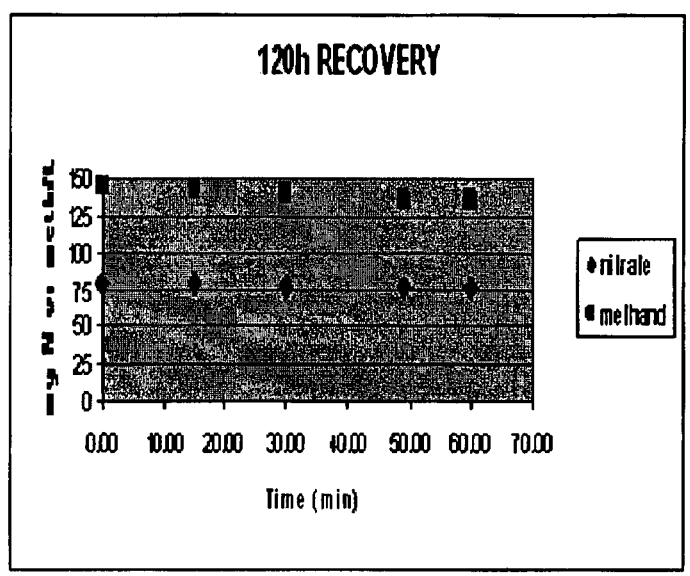

Table 3 shows the activity recovery of the biomass in the experimental reactor. The detailed experimental results are shown in FIG. 2.

TABLE 3

Activity recovery of the biomass in the experimental reactor (Day 2 is the time when recovery started)

|  | Day 2 | Day 3 | Day 4 | Day 7 |
| --- | --- | --- | --- | --- |
| mg N—NO$_3^-$/gVSS*min | 0.004 | 0.004 | 0.022 | 0.089 |
| mg Methanol/gVSS*min | 0 | 0.133 | 0.067 | 0.235 |

Treatment of the Full-Scale Sludge

TABLE 4

Live and dead cells in the control and experimental reactors 48 hours after the starvation (Full-scale sludge)

| FNA TREATED (29 images) | | | Control (28 images) | | |
| --- | --- | --- | --- | --- | --- |
| Average (% dead cells) | St dev. | St. Error | Average (%) | St dev. | St. Error |
| 63.6 | 14.9 | 0.13 | 17.6 | 5.6 | 0.08 |

The above experiments showed that free nitrous acid (FNA) is strongly biocidal. Exposed to FNA at a concentration of approximately 1 ppm for 48 hours, a substantial fraction of the bacteria in the sludge were killed. The biomass lost 99% of its activity.

This recovery of the activity was slow, which was likely due to the growth of the residual live cells rather than the recovery of dead cells.

As the FNA killed a large percentage of the bacteria in the sludge, those bacteria would be more easily biodegradable and therefore their carbon content would be more readily available for utilisation by the microbial population in an anaerobic or an aerobic digester or in a bioreactor for treating wastewater. Thus, enhanced utilisation of the sludge in the digester or in the bioreactor is possible. This would also lead to reduction of the amount of sludge to be disposed of.

Accordingly, as a further advantage, embodiments of the present invention can also reduce the amount of sludge that needs disposal. This also adds to the benefits and economics of the present invention.

The FNA can be generated as part of the overall water treatment process, thereby allowing the FNA to be formed at a low price. Accordingly, the present invention becomes economically favourable.

EXAMPLE 2

The aim of this study is to experimentally evaluate the feasibility of FNA to improve the biodegradability of secondary sludge. In general, primary sludge is readily hydrolysable (Mahmood and Elliott, 2006; Foladori et al., 2010). Hence, this study only focussed on secondary sludge. A series of batch tests were conducted through the use of an enriched methanol-utilising denitrifiers culture, which was employed as secondary sludge in this study. LIVE/DEAD staining was performed to examine the biocidal effect of FNA by verifying the integrity of cell membrane. The deactivation of secondary sludge and the recovery of their activities after FNA treatment were investigated by comparing the nitrate reduction rates of the experimental and control reactors. The improvement of biodegradability of secondary sludge was assessed by the measurement of oxygen uptake rates (OURs) and nitrate accumulation.

Materials and Methods
LIVE/DEAD staining

The LIVE/DEAD BacLight™ bacterial viability kits (Moleculer Probes OL-7012) were used to discriminate between viable cells and dead cells (Ziglio et al., 2002; Invitrogen Molecular Probes, 2003). The BacLight™ bacterial viability kits contain green-fluorescent nucleic acid stain SYTO® 9 and red-fluorescent nucleic acid stain Propidium Iodide (PI). When used alone, the SYTO® 9 stain generally labels all bacteria that have both intact membranes and damaged membranes. In contrast, PI stain penetrates only those bacteria with damaged membranes, causing a reduction in the SYTO® 9 stain fluorescence when both dyes are present. For this reason, bacteria with intact cell membranes (viable cells) stain green fluorescence, whereas bacteria with damaged membranes (dead cells) stain red fluorescence.

During the staining experiments, sludge samples (1 ml in each testing) were transferred into 5-ml plastic tubes in conjunction with 1.5 µl of SYTO® 9 and 1.5 µl of PI, and incubated in a dark place for 15 min at the room temperature, making staining reactions complete. Then, slides with stained sludge samples (10 µl on each slide) were observed and photographed using a confocal laser scanning microscope (Zeiss LSM 510 META), equipped with a Krypton-Argon laser (488 nm) and two He—Ne lasers (543 and 643 nm). Thirty images were taken randomly for each sample. Quantification of viable and dead cells was performed with Daime version 1.3.1 using the biovolume fraction function (Daims et al., 2006). Based on the obtained values, ratio of green fluorescence to total fluorescence (red+green fluorescence) was thus determined, which are equivalent to ratio of viable cells to total cells (viable+dead cells).

Results
Biocidal Effect of FNA on Secondary Sludge

Figure 3:
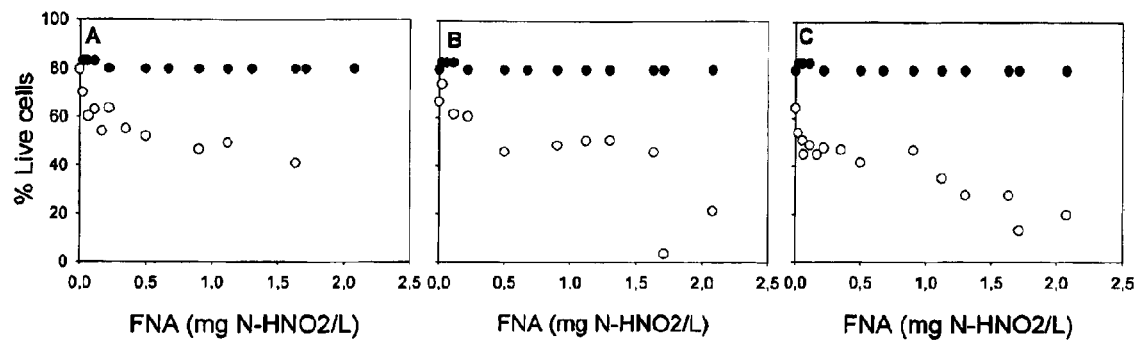
FIG. 3 shows the dependency of viable cell ratios on FNA concentration after exposure time of: A—8 h; B-24 h; C-48 h. ● viable cells before exposure; ○ viable cells after exposure.
Figure 4:
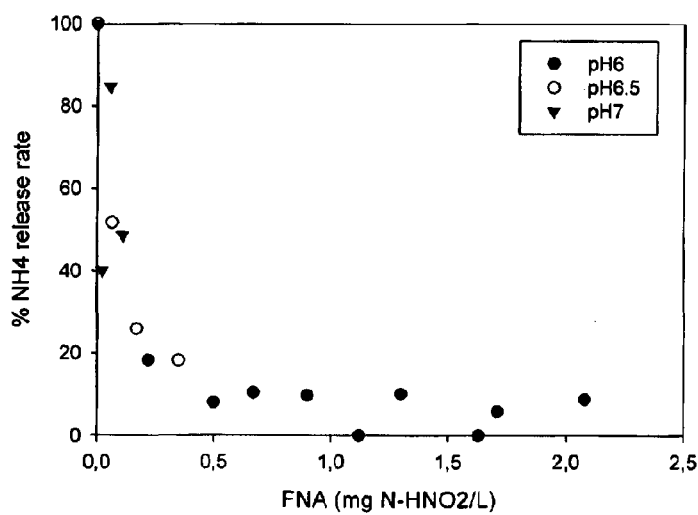
FIG. 4 shows the dependency of ammonium release rate and FNA concentrations during the sludge treatment with FNA.

FIG. 3 shows the dependency of viable cell ratios on FNA concentration after the specified exposure times. The results presented in FIG. 4 show that:

Fraction of viable cells decreased with increasing FNA concentration.

Time of exposure to FNA also affects cell viability. Smaller live cell fraction is observed with 48 h of exposure, with the biggest difference observed at the highest FNA concentrations tested.

Ammonia Release During FNA Treatment.

FIG. 4 shows the dependency of ammonium release rate and FNA concentrations during the sludge treatment with FNA. The results in FIG. 4 show that:

$NH_4^+$ release rate under famine conditions is an indication of the hydrolysis of intracellular compounds release during the decay of dying cells. This hydrolysis is taken place by the activity of other living microorganisms present in the sludge.

A decrease on the $NH_4^+$ release rate while increasing the FNA concentration where the sludge is being exposed to could indicate there is less biological activity to carry out this hydrolysis and therefore $NH_4^+$ is not being produced.

Activity of Secondary Sludge after FNA Treatment

Figure 5:
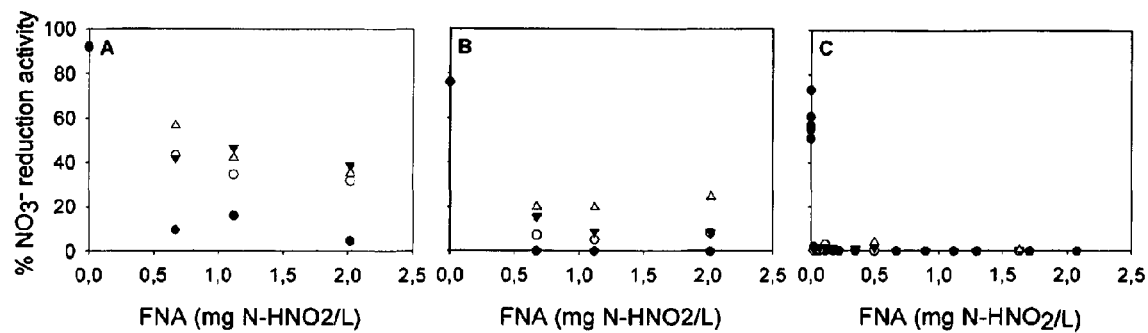
FIG. 5 shows the recovery of the nitrate reduction rate activity after different periods of sludge treatment with FNA: A—8 h; B-24 h; C-48 h. Different symbols represent the denitrification activity after different recovery times: ● 0 h recovery time; ○ 24 h recovery time; ▼ 48 h recovery time; Δ 72 h recovery time.

FIG. 5 shows the recovery of the nitrate reduction rate activity after different periods of sludge treatment with FNA. The results shown in FIG. 5 demonstrate that:

Sludge exposure time to FNA has an effect on the level of biological activity remaining (measured as denitrification activity since the sludge was mainly composed by denitrifying microorganisms).

With a lower exposure time (8 h to FNA, FIG. 3.A), biomass activity displays a recovery, while when exposed to the longest time to FNA, the biomass activity recovery is almost negligible even at the lowest FNA concentration exposure.

Figure 6:
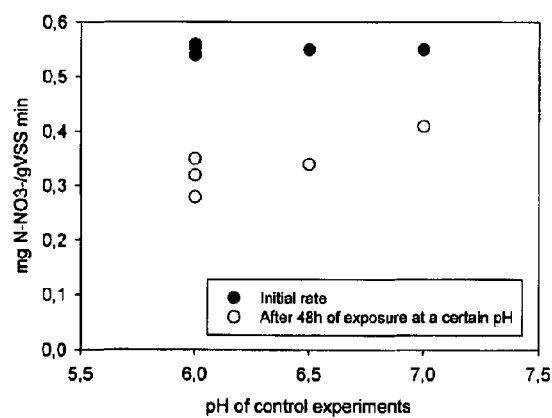
FIG. 6 shows nitrate reduction rate from the sludge used (●) and after being exposed 48h at certain pH (○)

FIG. 6 shows nitrate reduction rate from the sludge used (●) and after being exposed 48h at certain pH (○). The results of FIG. 6 show that pH has also a detrimental effect on activity recovery. This negative effect increases when lowering the pH and increasing the exposure time.

Figure 8:
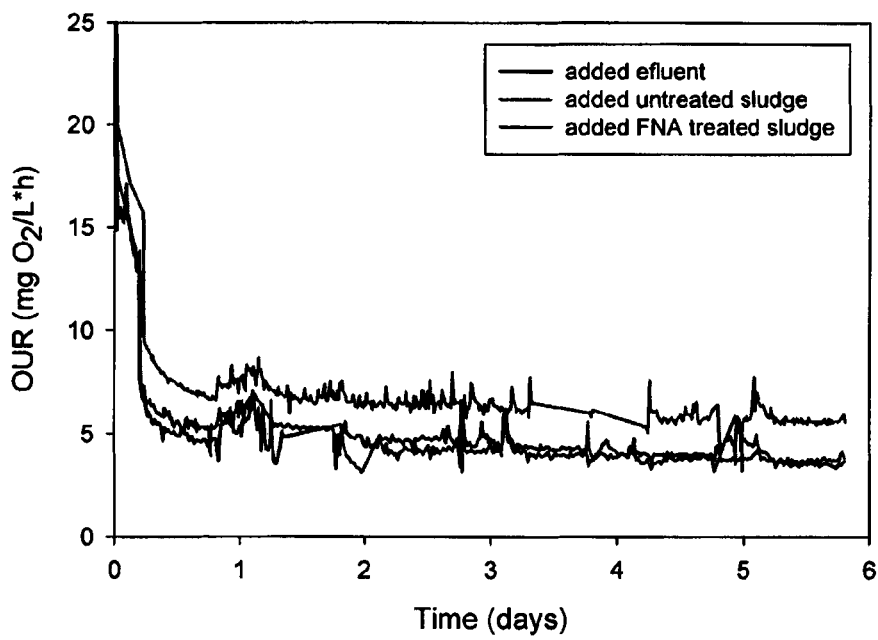
FIG. 8 shows Oxygen Uptake Rate (OUR) as a function of the duration of aerobic digestion.

Aerobic Biodegradability of the FNA Treated Sludge 3 batch reactors were inoculated with full-scale WWTP fresh sludge, previously aerated to deplete any COD present in the sludge. These batch reactors were run identically, with the pH controlled at 7 and the DO kept between 3-4 ppm. In the 1st reactor, 100 mL of FNA treated sludge (2.02 mg N—$HNO_2$/L during 48 h) was added. In the second reactor, 100 mL of untreated sludge was added. In the 3rd reactor, treated effluent (non-detectable COD, no detectable N) from a lab-scale denitrifying reactor was added. In the 2nd and 3rd reactor, nitrite was added to mimic the concentration of nitrite present in the 1st reactor after the addition of the FNA treated sludge (45 mg N—$NO_2$-/L). FIG. 8 shows nitrate concentration as a function of the duration of aerobic digestion.

Figure 7:
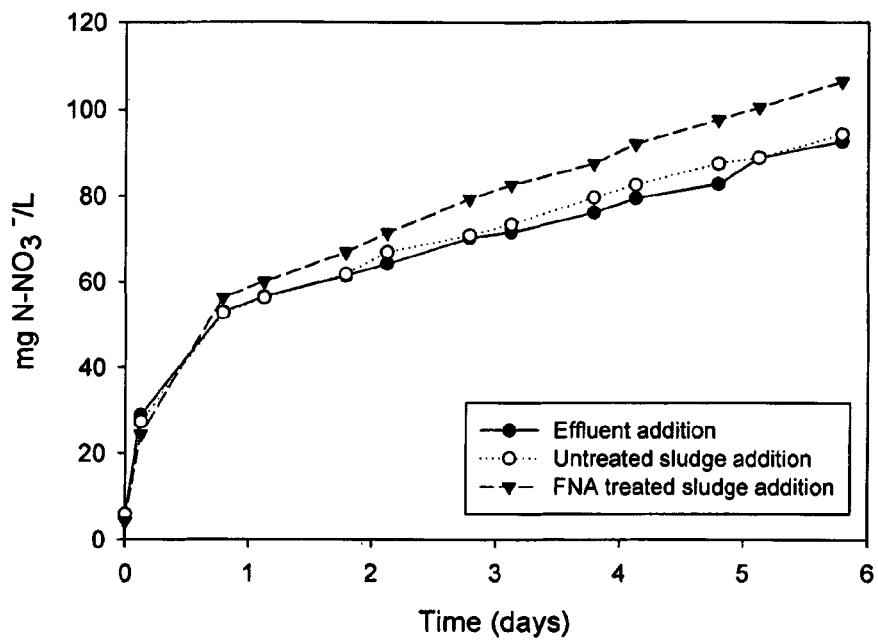
FIG. 7 shows nitrate concentration as a function of the duration of aerobic digestion.

The results of FIG. 7 demonstrate that a higher increase of nitrate in the 1st reactor where the FNA treated sludge has been added indicates a major biodegradability of this sludge. The hypothesis behind this affirmation is that biomass present in the reactor can hydrolyse some of the intracellular compounds from those cells that are damaged or dead. The product of hydrolysis would be $NH_4^+$ but due to the presence of nitrifiers, it is converted to nitrate.

Table 5 shows measured data for mass balance evaluation.

TABLE 5

Measured data for mass balance evaluation

| Reactor | MLVSS (mg/L) | | $NO_3$ (mg N/L) | | Averaged OUR (mg $O_2$/L · h) |
|---|---|---|---|---|---|
| | initial | final | initial | final | |
| Reactor with FNA-treated sludge | 3340 | 2660 | 4.25 | 106.4 | 8.096 · 55 |
| Reactor with untreated sludge | 3340 | 2840 | 5.95 | 94.3 | 6.614 · 50 |
| Reactor with effluent | 3040 | 2515 | 5.81 | 92.7 | 6.404 · 63 |

The mass balance calculations show that:

The extra VSS consumption in Reactor 1 compared to Reactor 3 was about (3340−2660)−(3040−2515)=155 mg/L The extra N released in Reactor 1 compared to Reactor 3 was about 15.3 mgN/L. The NNSS release ratio was about 15.3/155=9.9%.

FIG. 8 shows the Oxygen Uptake Rate (OUR) as a function of the duration of aerobic digestion. This shows that OUR in reactor with FNA-treated sludge (Reactor 1) was consistently higher than that in the two other reactors (Reactors 2 and 3). This suggests that the sludge biodegradability was improved after FNA treatment.

Mass Balance

The OUR in Reactor 1 was about 1.92 mg/L.h higher than the OUR in Reactor 3 (Table 5). This is about 46 mgO2/L.day. Over the 5.79 day period, the total extra $O_2$ consumption would be 266 mgO2/L. The extra N released in Reactor 1 compared to Reactor 3 was about 15.3 mgN/L. 15.3 mg N/L can consume 70 O2/L (15.3*4.57). The amount of the sludge added was 100 ml. The data suggest that the FNA-treated sludge provided 3920 mgCOD/L ((266−70)*20) over the 5.79 day period (392 mgCOD/0.1 L).

FNA-treated concentrated sludge (SBR) VSS: 6120 mg/L. The VSS consumption ratio in the FNA-treated sludge was about 155*20 (dilution time)/6120=50%.

The COD concentration of FNA-treated sludge was around 8017 mg COD/L. This indicates that FNA treated-sludge provided 400 mg COD/0.1 L (8017*0.1*50%; 50% means VSS consumption ratio in the FNA-treated sludge) over the 5.79 day period, which was comparable to 392 mg COD/0.1 L determined according to OUR. This implies that the results of OUR were reasonable.

EXAMPLE 3

This example had an objective of evaluating differential killings of AOB (ammonia oxidizing bacteria), NOB (nitrite oxidizing bacteria) and OHOs (ordinary heterotrophic organisms) by FNA.
Experiment Protocol (Briefly):
Step 1: Measuring the original activities of AOB, NOB and OHOs (i.e., before FNA treatment):
Activities of AOB and NOB:

Sludge was taken out from the parent reactor (SBR) at the end of an aerobic period and then transferred into a batch reactor. Afterwards, ammonium and nitrite stock solutions were added to the batch reactor, resulting in the ammonium and nitrite concentrations of 25 mg NH4-N/L and 20 mg NO2-N/L, respectively. Air was supplied during the whole experiment period (DO was not limiting, i.e. >3 mg/L). pH was controlled in the range of 7.5-8 during the whole experimental period. The activities of AOB and NOB were determined as biomass-specific nitrite+nitrate and nitrate production rates, respectively.
Aerobic Activity of OHOs:

Sludge was taken out from the parent reactor at the end of an aerobic period and then transferred into a batch reactor. Afterwards, sodium acetate and ammonium stock solutions were added to the batch reactor, resulting in the COD and ammonium concentrations of 150 mg COD/L and 20 NH4-N/L, respectively. Air was supplied during the whole experiment period (DO was not limiting, i.e. >3 mg/L). pH was controlled in the range of 7.5-8 during the whole experimental period. The aerobic activity of OHO was determined as biomass-specific COD consumption rates.
Step 2: Exposing sludge to various FNA levels for 24 h The experimental conditions applied in batch testing are set out in Table 6.

TABLE 6

Experimental conditions applied in batch tests in Example 3 (exposure time = 24 h)

|  | Batch 1 | Batch 2 | Batch 3 | Batch 4 | Batch 5 | Batch 6 | Control |
|---|---|---|---|---|---|---|---|
| $NO_2^-$ (mgN/L) | 100 | 200 | 300 | 550 | 700 | 1100 | 0 |
| pH | 6 | 6 | 6 | 6 | 6 | 6 | around 7.5 |
| FNA (mgN/L) | 0.22 | 0.45 | 0.67 | 1.24 | 1.57 | 2.47 | 0 |

Figure 9:
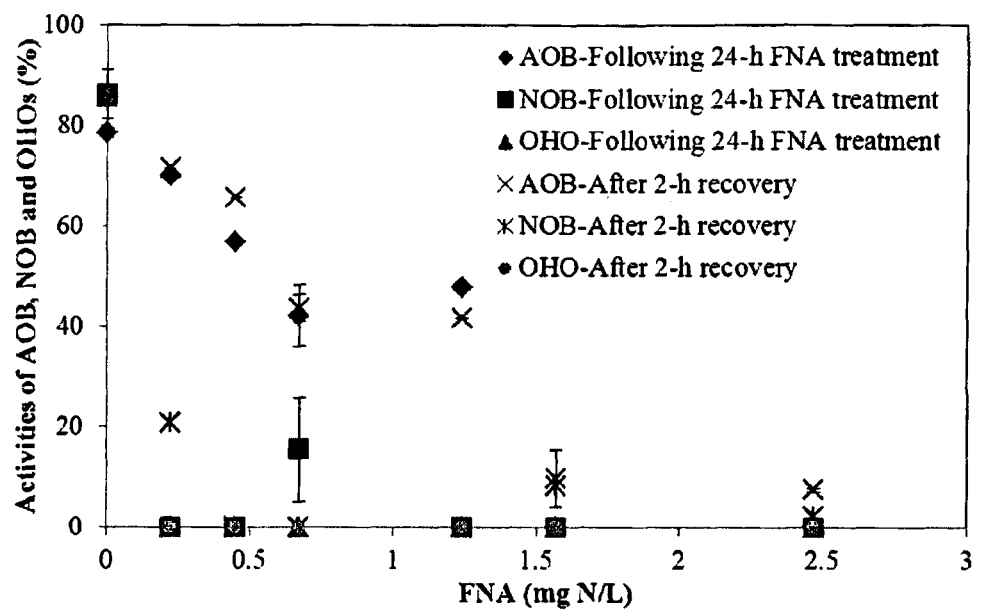
FIG. 9 shows activities of AOB and NOB, relative to the activities prior to FNA treatment (error bars indicate the standard errors). AOB: ammonia-oxidising bacteria; NOB: nitrite-oxidising bacteria; OHO: ordinary heterotrophic bacteria.

Step 3: Measuring the Activities of AOB, NOB and OHOs Following FNA Treatment and after 2-h Recovery, with the Procedures Described Above. The Results are Shown in FIG. 9.

The above differential killing can be utilized to achieve nitrogen removal via the nitrite pathway, that is, though ammonium oxidation to nitrite and then nitrite reduction to dinitrogen gas (NH4+□NO2-□N2) without going through nitrate. This can be achieved through appropriately chosen FNA level and treatment duration, and the solids retention time in the SBR such that NOB are eliminated from the system while AOB are maintained. This process reduces the oxygen requirement for nitrification by 25% and the carbon requirement for denitrification by 40%.

EXAMPLE 4

This example investigates pretreating a sludge in accordance with an embodiment of the present invention in order to demonstrate that the present invention can reduce the amount of sludge that would otherwise be formed. In this experiment, a lab-scale sequencing batch reactor (SBR) with a working volume of 8 L was used in this study. The SBR was operated with a cycle time of 6-h, consisting of 10 min anoxic feed, 70 min anoxic reaction, 225 min aerobic reaction, 5 min sludge wasting, 45 min settling and 5 min decanting periods. In each cycle, 2 L of synthetic wastewater containing 400 mg COD and 50 mgN/L TKN including 40 mgNH4+-N/L, made from milk powder and ammonium chloride, along with other trace elements, was pumped into the SBR in the 10 min feed period, resulting in a hydraulic retention time (HRT) of 24 h. Before settling, around 133 ml of mixed liquor was wasted, giving rise to a sludge retention time of 15 days. The SBR was operated at a temperature of 18±2° C., with DO being controlled between 1.5-2.0 mg/L by a programmable logic controller (PLC) in the aerobic period. The pH in the system was recorded but not controlled and fluctuated between 7.2 and 7.5 during a typical cycle.

50% of the wasted mixed liquor was treated by 2.0 mg HNO2-N/L for approximately 24 h, 30 h, 36 h and 42 h, respectively. Afterwards, the free nitrous acid (FNA)-treated sludge was returned to the SBR and therefore sludge retention time (SRT) was maintained at approximately 30 days.

The sludge wasted from the SBR was allowed to settle. 50% of the concentrated sludge was treated with free nitrous acid (FNA) at approximately 2 ppm (pH=6.0) and for approximately 24 hours and the sludge was then recycled to the reactor. The other 50% of the sludge was sent to disposal.

A control SBR operating under identical conditions was also fed with the same wastewater, but there was no recycle of any sludge to this reactor.

Table 7 shows the measured and predicted MLSS (mixed liquor suspended solids) and MLVSS (mixed liquor volatile suspended solids) data (with standard errors) for this test after the reactors reached steady state.

TABLE 7

Measured and predicted MLSS and MLVSS data (with standard errors) for sludge minimization test after reaching steady state

| | MLSS (mg/L) | | MLVSS (mg/L) | |
|---|---|---|---|---|
| Reactor | Measured | Predicted if FNA did not improve sludge degradability | Measured | Predicted if FNA did not improve sludge degradability |
| Control reactor | 1527 ± 6 (n = 26) | — | 1465 ± 6 (n = 26) | — |

TABLE 7-continued

Measured and predicted MLSS and MLVSS data (with standard errors) for sludge minimization test after reaching steady state

| | MLSS (mg/L) | | MLVSS (mg/L) | |
|---|---|---|---|---|
| Reactor | Measured | Predicted if FNA did not improve sludge degradability | Measured | Predicted if FNA did not improve sludge degradability |
| FNA reactor | 1762 ± 9 (n = 14) | 2369 | 1686 ± 8 (n = 14) | 2274 |

The mass balance analysis of the MLSS and MLVSS indicate that:
a) approximately 75% of the FNA treated sludge was degraded in the reactor;
b) overall sludge production in the experimental SBR system represents only 60% that from the control SBR. In other words, sludge production is reduced by 40%. The cost saving implication is substantial given the fact that sludge treatment and disposal represent up to 50-60% of the total costs in a wastewater treatment plant.

The concentrations of effluent NH4-N, NO2-N and NO3-N were also measured and the results are shown in Table 8:

TABLE 8

Measured effluent $NH_4$—N, $NO_4$—N and $NO_3$—N data (with standard errors) of the two reactors in steady state

| $NH_4$—N (mg/L) | | $NO_2$—N (mg/L) | | $NO_3$—N (mg/L) | |
|---|---|---|---|---|---|
| Control | With FNA treatment | Control | With FNA treatment | Control | With FNA treatment |
| 0.1 ± 0.1 | 0.1 ± 0.01 | 0.01 ± 0 | 0.01 ± 0 | 13.8 ± 0.4 | 11.8 ± 0.4 |

The data in Table 8 show that the return of the FNA-treated sludge to the experimental SBR reduced effluent nitrate concentration by 2 mgN/L (that is, by 15%).

Those skilled in the art will appreciate that the present invention may be susceptible to variations and modifications other than those specifically described. It will be understood that the present invention encompasses all such variations and modifications that fall within its spirit and scope.

Throughout this specification, the term "comprising" and its grammatical equivalents shall be taken to have an inclusive meaning unless the context of use indicates otherwise.

The invention claimed is:

1. A method for treating a sludge, the method comprising:
   (a) contacting the sludge with free nitrous acid to obtain a mixture thereof, wherein the mixture of sludge and free nitrous acid has a pH that is less than 6, and wherein the mixture of sludge and free nitrous acid has a free nitrous acid content of at least 0.3 ppm, such that a substantially large part of bacteria is eliminated from the system upon contacting the sludge with the free nitrous acid; and
   (b) feeding the mixture of sludge and free nitrous acid from step (a) to a bioreactor for treating wastewater, or an anaerobic or aerobic sludge digester.

2. A method as claimed in claim 1 wherein the sludge comprises a sludge from a secondary settler or from a bioreactor treating wastewater.

3. A method as claimed in claim 1 wherein the mixture of sludge and free nitrous acid has a pH that is than 4.

4. A method as claimed in claim 1 wherein the mixture of sludge and free nitrous acid has a free nitrous acid content of at least 0.5 ppm.

5. A method as claimed in claim 1 wherein the free nitrous acid is continuously added to the sludge being treated or the free nitrous acid is added to the sludge on an intermittent basis.

6. A method as claimed in claim 1 wherein the sludge is contacted with free nitrous acid by contacting the sludge with a liquid stream containing free nitrous acid.

7. A method as claimed in claim 6 wherein the liquid stream containing free nitrous acid has a pH that is less than 4.

8. A method as claimed in claim 6 wherein the liquid stream containing free nitrous acid has a free nitrous acid content of at least 0.5 ppm.

9. A method as claimed in claim 1 wherein the sludge is thickened prior to treatment.

10. A method as claimed in claim 1 wherein operating parameters are controlled such that nitrite oxidising bacteria are largely eliminated from the system whilst ammonium oxidising bacteria remained in the system, whereby nitrogen removal is achieved via the nitrite pathway.

11. A method as claimed in claim 1 wherein other treatment chemicals are also added.

12. A method as claimed in claim 11 wherein the other treatment chemicals are selected from hydrogen peroxide and oxygen.

13. A method as claimed in claim 1 wherein a treatment time from one hour to 1 week is utilised.

14. A method for treating a sludge comprising treating the sludge in accordance with a method as claimed in claim 1 and passing the treated sludge to a digester or to a bioreactor for treating wastewater.

15. A method for treating a sludge, the method comprising the steps of:
   (a) treating the sludge with free nitrous acid to form a mixture thereof and reduce a level of ammonium oxidizing bacteria (AOB) and to reduce nitrate-oxidizing bacteria (NOB) and other heterotrophic organisms (OHO) to a significantly greater level to thereby minimise oxidation of nitrite to nitrate, wherein the mixture of sludge and free nitrous acid has a pH that is less than 6, and wherein the mixture of sludge and free nitrous acid has a free nitrous acid content of at least 0.3 ppm; and
   (b) subsequently subjecting the nitrite produced in step (a) to a reduction treatment to produce dinitrogen gas.

16. A method as claimed in claim 15 wherein the step of treating the sludge or other effluent with FNA largely eliminates NOB.

17. A method as claimed in claim 15 wherein the step of treating the sludge or other effluent with FNA largely reduces OHO.

18. A method as claimed in claim 1 wherein the mixture of sludge and free nitrous acid has a pH that is less than 2.

19. A method as claimed in claim 6 wherein the mixture of sludge and free nitrous acid has a pH that is less than 2.

20. A method as claimed in claim 1 wherein the mixture of sludge and free nitrous acid has a free nitrous acid content of at least 1 ppm.

21. A method as claimed in claim 1 wherein the mixture of sludge and free nitrous acid has a free nitrous acid content of at least 2 ppm.

22. A method as claimed in claim 6 wherein the liquid stream containing free nitrous acid has a free nitrous acid content of at least 1 ppm.

23. A method as claimed in claim 6 wherein the liquid stream containing free nitrous acid has a free nitrous acid content of at least 2 ppm.

* * * * *